United States Patent Office

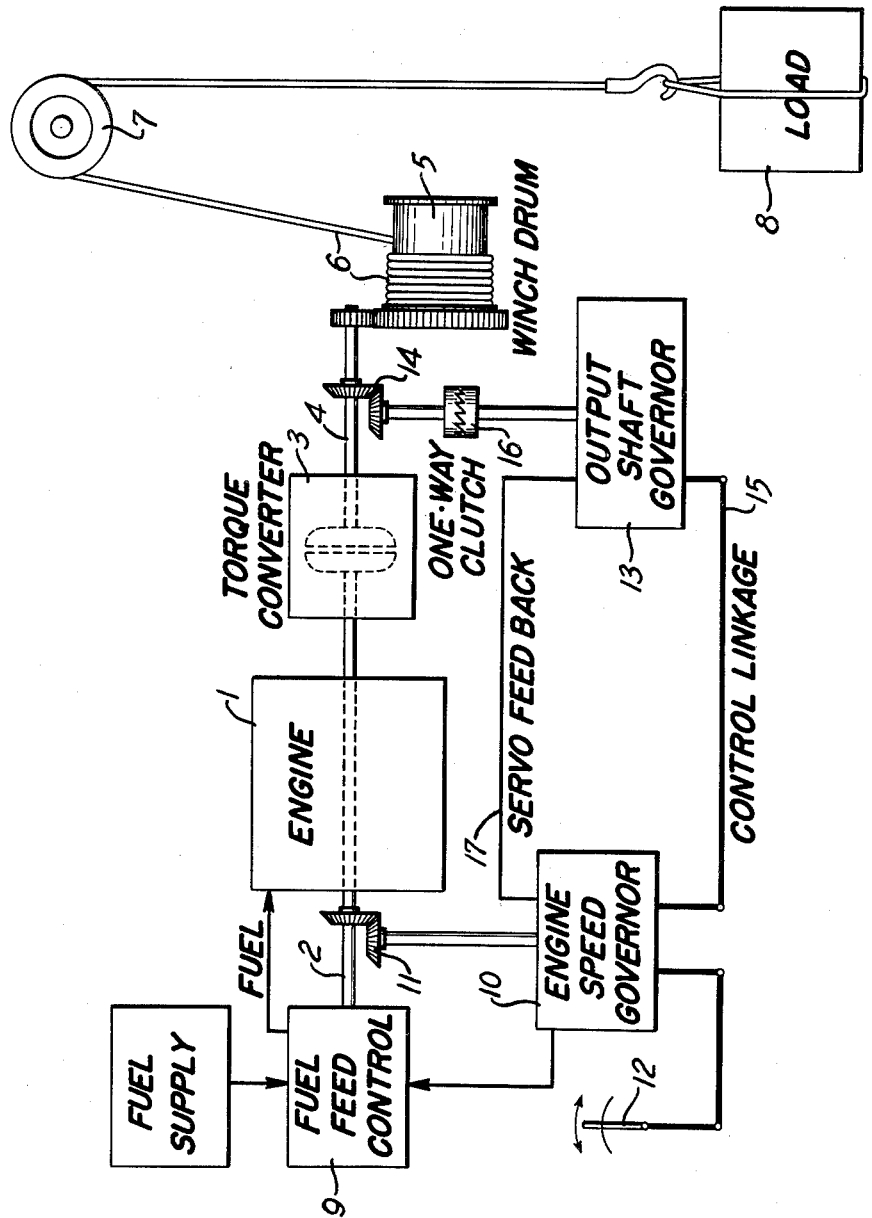

3,102,434
Patented Sept. 3, 1963

3,102,434
AUTOMATIC CONTROL OF OUTPUT REVERSAL IN SLIPPABLE DRIVES FOR TRANSMITTING TORQUE
Robert Cramer, Jr., Hales Corners, Wis., assignor to Murphy Diesel Company, Milwaukee, Wis., a corporation of Delaware
Filed Oct. 16, 1959, Ser. No. 846,954
8 Claims. (Cl. 74—472)

This invention relates to automatic control of output reversal in slippable drives for transmitting torque including torque converter drives and couplings of the type in which the resistance to slip is a function of the ratio between the input speed and the output speed.

The invention has been applied to the drive of winches wherein, as in hoisting, it may become desirable to control the pay out of the cable and to utilize the slippable drive as a brake therefor when the load is lowered.

Fluid couplings and other slip couplings including low friction torque converters such as single stage hydrokinetic torque converters are susceptible to approaching a condition of zero torque transmission when the speed of the output shaft in reverse caused by the over-powering load produces a fluid flow substantially counteracting the forward drive flow in the coupling or converter by an idling or low speed engine. When this condition is reached there is substantially no brake on the load through the drive and, if it is a hoist load, it becomes free to fall by gravity.

In practice heretofore, this free drop of a hoist load has been prevented by the operator judging the down speed of the load and manually moving the engine fuel feed lever to increase the engine speed and thereby increase the drive torque of the coupling or converter to a safe value above the reverse input torque created by the paying out of the hoist cable due to such downward overhauling load movement. Since loads vary, it is difficult for the operator to be safe and still obtain rapid downward movement of the load. This is particularly so in the operation of erection cranes where the load is first lifted to beyond its desired location and then dropped to location, and also in oil well drilling operations where a string of casing has to be lowered into the well at high speed.

The present invention provides an automatic control for the downward movement of the load without requiring the operator's instant attention and which permits a speed of gravity fall for the load that is close to the maximum safe speed obtainable or which can be set as desired. The invention is applicable wherever the load is permitted to overhaul or reverse the direction of rotation of the output shaft of a slippable drive such as a fluid coupling or torque converter and may have other uses than in hoists.

The accompanying drawing illustrates the best mode of carrying out the invention as presently contemplated and described hereinafter.

In the drawing, the single FIGURE is a block diagram with schematic illustration of the connections between the elements, showing broadly of the structural combination for carrying out the present invention.

Referring to the drawing, the engine 1 may be any suitable source of supply such as an internal combustion engine, turbine or electric motor, and has an engine shaft 2 that constitutes the input shaft of a torque converter 3, which may be either a fluid, electro-magnetic or other type of coupling without stator vanes or a torque multiplier type of torque converter having one or more stages with stator vanes.

The output shaft 4 of the torque converter 3 drives a load which in this instance is illustrated by the winch drum 5, cable 6 wound thereon, hoist sheave 7 over which the cable 6 passes, and load 8 suspended by the cable and which is to be raised or lowered at the will of the operator.

Where the engine 1 is of the internal-combustion type the fuel supply 1 passes through a carburetor or fuel metering device 9, depending upon whether the engine is of the gasoline fuel type or of the diesel type. In the latter instance the metering device 9 will be driven from the engine shaft 2, and an engine speed governor 10 driven by suitable gearing 11 from shaft 2 is connected to regulate the metering device 9 to effect a given engine speed.

For this latter purpose the manual throttle lever 12 is connected to the governor 10 to change its speed setting and thereby change the speed of engine 1 as determined by the operator.

Movement of lever 12 to increase the engine speed substantially above the idling speed setting of governor 9 will effect a given torque transmission through converter 3, thereby driving winch drum 5 in a direction to lift load 8. When load 8 has been lifted to a height above that necessary for final release, as in an erection crane, the operator then moves lever 12 to reduce the engine speed to a point where lifting will stop and the load pull on the output side of the torque converter 3 will stall the latter. Further reduction in engine speed will reduce the input torque of the converter beyond the converter stall point and the converter output shaft 4 will start to reverse in direction under the load which is represented by the gravity pull of load 8 causing payout of cable 6 from drum 5.

If the gravity fall of load 8 effects an acceleration, as when the operator returns lever 12 to engine idling position, the speed of cable payout may effect the reverse drive of shaft 4 at a speed that will nearly balance the opposed torques thus produced in the converter and substantially stop all flow of power fluid through the converter. At this point there will be a free slip between the input and output elements of the converter and the engine torque will not be effective to prevent the free fall of load 8. As a consequence load 8 will plummet to the ground out of control and may cause severe damage.

According to the present invention an automatic control is provided which prevents the torque converter output shaft 4 from running away and load 8 from free falling. For this purpose a speed sensing device 13, illustrated in the drawing as an output shaft governor, is connected to be responsive to the reverse movement of the output, as by gears 14 driving the same from shaft 4.

The device 13 may be any device that measures the reverse speed of the output shaft 4 and converts the speed proportionally into lever actuation. Such governor devices may be of the centrifugal fly-ball type, hydraulic pump type, or voltage generator type, all of which are standard devices on the market.

The governor 13 is connected as by suitable lever and link mechanism 15 to the engine governor 10 whereby when the speed of shaft 4 in reverse approaches a given maximum safe speed in reverse, the engine throttle or speed setting of governor 10 is moved to thereby increase the engine speed and the power or torque input to the torque converter.

The linkage 15 may be either mechanical, hydraulic or electrical, depending upon the nature of the governor device 13. Where the governor 10 is centrifugal, linkage 15 will adjust the speeder spring of the governor in a manner over-riding the adjustment obtained by hand lever 12.

The effect is to utilize the engine 1 and torque converter 3 or other slippable drive as an automatic brake for controlling the downward fall of load 8, making it possible for the operator to return lever 12 to engine idling position without concern that the load will accelerate to a free fall speed.

When it is desired to stop the fall of load 8 at any time, the operator merely moves lever 12 to overtake the controlled setting of governor 10 and to move the governor to a position further increasing fuel to the engine 1, whereby the engine will increase in speed and fully brake the fall of the load. By thus adjusting the engine speed the operator can suspend load 8 stationary in mid-air or may lift the load or lower it at will.

If the output speed control governor 13 is of a type operable in either direction of rotation, and unless other means are employed to prevent or reverse its control of the engine 2 during forward rotation of shaft 4 as when lifting load 8, governor 13 must be disconnected from its drive gears 14 at that time, as by a suitable one way clutch 16 which effects driving of a governor 13 only when shaft 4 is rotating in reverse under the overhauling influence of the falling load 8 or other load.

The invention relieves the operator from having to judge the falling speed of load 8 and from manually controlling the speed through the engine throttle. It provides a system whereby the load 8 may be lowered at the maximum safe falling speed without accelerating to a free fall speed. The governor 13 may be adjusted to provide a selected predetermined limit of load reversal speed as near to the safe falling speed as may be desired, whereby the load forces which buck and exceed the output drive forces are automatically resisted by the additional power input to the drive establishing a new drive output.

If desired governor 13 and governor 10 can be connected by a servo linkage 17 so that when governor 13 calls for greater engine torque to brake the down drop of the load, and as the engine speed then increases and thereby drives governor 10 at an increased speed according to its setting, the governor 13 will be adjusted by the feed back 17 to maintain the new engine speed setting for governor 10 even though the reverse speed of the shaft 4 which drives governor 13 may be slightly reduced. In this way a substantially constant overhauling speed can be maintained for the given load.

The invention is also applicable to electric motor drives, in which case the power input to the motor will be controlled by governor 13 as by suitable current or voltage control means in place of fuel meter 9 and governor 10.

Various structural embodiments of the invention may be employed within the intended scope of the accompanying claims.

I claim:

1. A load hoist comprising a winch adapted to lift or lower a load depending upon the direction of rotation of its drum, a hydrokinetic torque converter having a torque input shaft and a torque output shaft, means to drive said winch drum from said torque output shaft in a direction to lift the load, an internal combustion engine connected to said torque input shaft to continuously drive the same in a direction tending to lift the load, fuel feed means connected to said engine to control the speed of the latter, a manual regulator to regulate said fuel feed means to effect lifting of the load by the engine when the engine speed provides a torque transmission for said torque converter exceeding the torque required to lift the load and to permit lowering of the load by gravity when the engine idles and the torque transmitted by said torque converter is insufficient to prevent reverse rotation of said output shaft by the load thereon, a speed sensing device connected to said output shaft and responsive to the speed of reverse rotation of the latter, and means connecting said speed sensing device to said engine fuel feed means for automatically increasing the speed of said engine upon a given reverse speed of said output shaft to increase the braking effect of said engine and torque converter in resisting gravity acceleration of the fall of the load, said manual regulator being constructed to override said automatic means so that the latter is operative only when the fuel feed setting of said manual regulator is below that called for by said speed sensing device.

2. A load hoist comprising a winch adapted to lift or lower a load depending upon the direction of rotation of its drum, a hydrokinetic torque converter having a torque input shaft and a torque output shaft, means to drive said winch drum from said torque output shaft in a direction to lift the load, an internal combustion engine connected to said torque input shaft to continuously drive the same in a direction tending to lift the load, fuel feed means connected to said engine to control the speed of the latter, a manual regulator to regulate said fuel feed means to effect lifting of the load by the engine when the engine speed provides a torque transmission for said torque converter exceeding the torque required to lift the load and to permit lowering of the load by gravity when the engine idles and the torque transmitted by said torque converter is insufficient to prevent reverse rotation of said output shaft by the load thereon, a speed sensing device connected to said output shaft and responsive to the speed of reverse rotation of the latter, a one way clutch connecting said speed sensing device to said output shaft to drive said speed sensing device only when said outpput shaft is rotated in reverse by the gravity fall of the load, and means connecting said speed sensing device to said engine fuel feed means for automatically increasing the speed of said engine upon a given reverse speed of said output shaft to increase the braking effect of said engine and torque converter in resisting gravity acceleration of the fall of the load, said manual regulator being constructed to override said automatic means so that the latter is operative only when the fuel feed setting of said manual regulator is below that called for by said speed sensing device.

3. Apparatus of the class described, comprising power means including a variable unidirectional power source and means for controlling the speed of the power source, a driven load moving means, slippable drive mechanism having input means connected to said power means and output means connected to said driven means, said output means being subject to reversal in direction caused by the load forces backing and exceeding the output forces, a speed sensing means for said output means responsive to the speed of reverse movement of said output means, and means connecting said speed sensing device to said speed control means to increase the speed of said power source upon a predetermined increase in said reverse output speed.

4. Apparatus of the class described, comprising power means including a variable speed power source and speed control means therefor, slippable torque transmitting means having an input shaft connected to said power source to be driven thereby, a driven load moving means, said torque transmitting means having an output shaft connected to said driven means and adapted to move the load in one direction in response to drive forces from said power source and to permit reverse movement of the load under control of the torque brake effect of said slippable means, a speed sensing means for said output shaft and responsive to the speed of reverse movement of the load, and means connecting said speed sensing means to the speed control means for said power source to increase the speed of said input shaft upon a predetermined increase in speed of reverse movement of the load.

5. The construction of claim 4, and means to adjust said speed sensing means, to provide a selected predetermined limit of load reversal speed under the automatic control of said sensing means.

6. The construction of claim 4, and means to make said speed sensing means inoperable during load movement in a forward direction.

7. The construction of claim 4, a one-way clutch between said speed sensing means and said output shaft operable to drive said speed sensing means only when the movement of the load is in reverse.

8. The construction of claim 4, and manual control means for said power source adapted to over-ride said power source increase by said speed sensing means.

References Cited in the file of this patent

UNITED STATES PATENTS

| | | |
|---|---|---|
| 2,872,827 | Thoma | Feb. 10, 1959 |
| 2,966,221 | Kinney | Dec. 27, 1960 |

FOREIGN PATENTS

| | | |
|---|---|---|
| 665,387 | Great Britain | Jan. 23, 1952 |